Oct. 19, 1926.                                              1,603,898
                         H. H. BOYCE
                  MEASURING CAP FOR CONTAINERS
              Filed Sept. 19, 1924        2 Sheets-Sheet 1
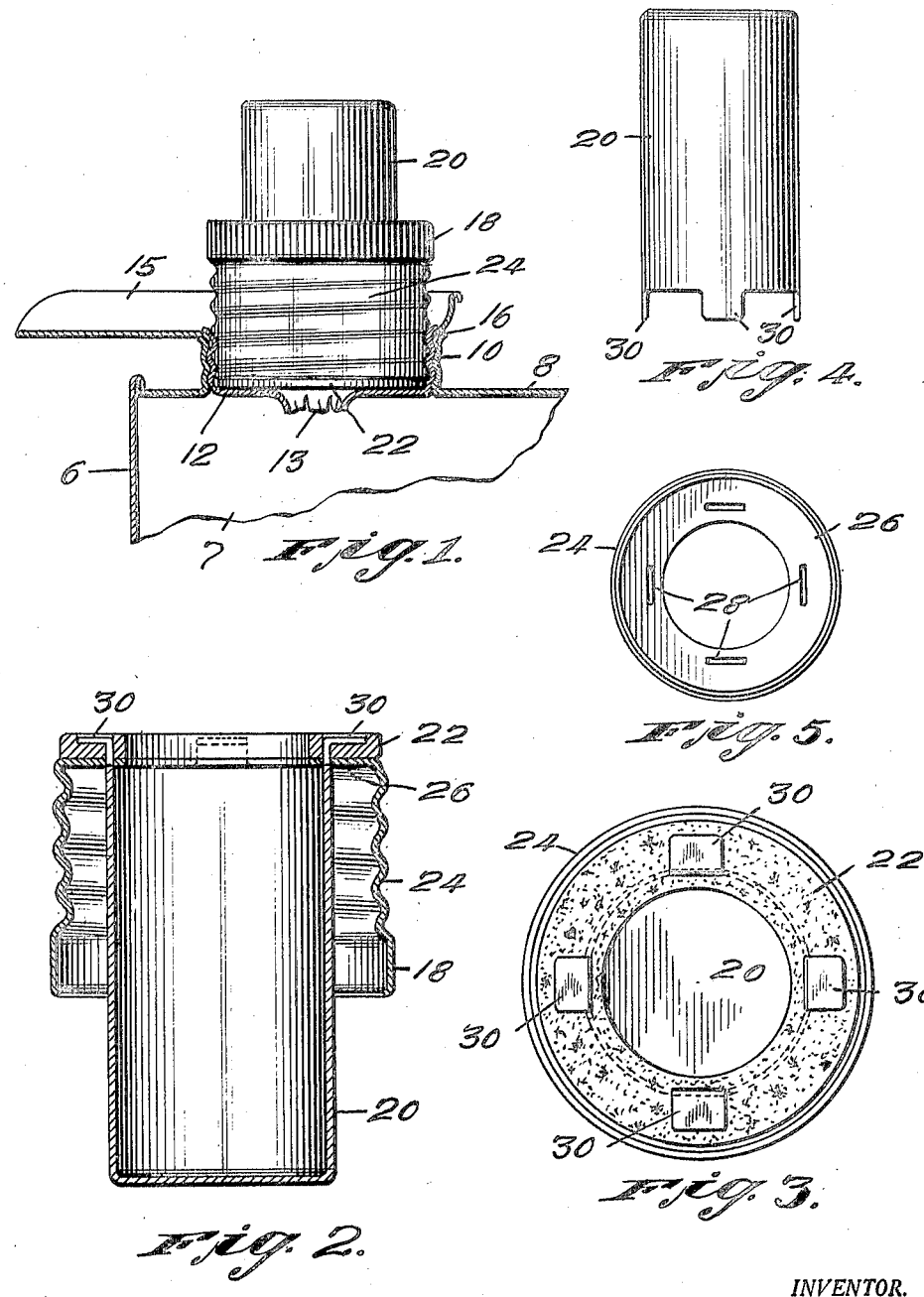
INVENTOR.
Harrison H. Boyce
BY
           ATTORNEYS.

Patented Oct. 19, 1926.

1,603,898

UNITED STATES PATENT OFFICE.

HARRISON H. BOYCE, OF JERICHO, NEW YORK.

MEASURING CAP FOR CONTAINERS.

Application filed September 19, 1924. Serial No. 738,598.

This invention relates to a combined measuring vessel and cap for containers adapted to hold substances which are to be used in certain measured quantities.

The general object of the invention is to provide a new and improved measuring cap for the emission opening of such a container, which is simple in construction, cheap to manufacture, and efficient and satisfactory in use.

Generally speaking, the present invention is characterized by the fact that the measuring vessel which is embodied in the cap is secured mouth downward in closing relationship to the emission opening of the container with which the cap cooperates, in such a manner that any liquid left in the measuring vessel will drain back into the container, and also in such a manner that the outside of the measuring vessel which is handled by the user, will not be wet by the splashing of the contents of the container, when the cap is performing its closing function.

Figure 7:
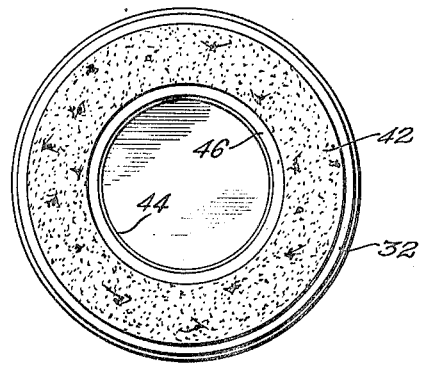
Figure 9:
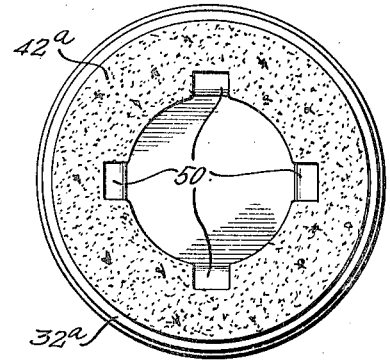
Figure 6:
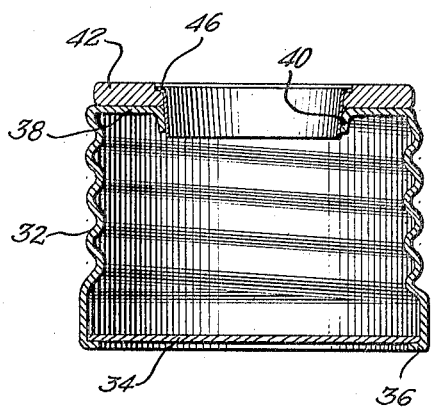
Figure 8:
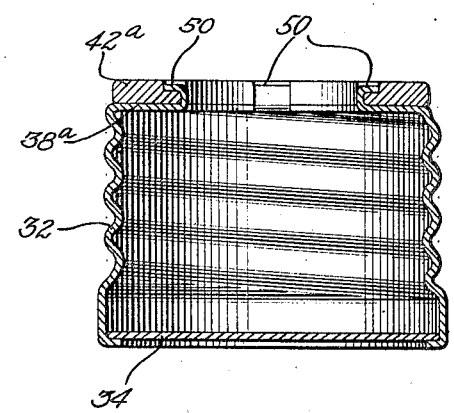

The invention will be understood from the following description of preferred embodiments thereof, taken in connection with the accompanying drawings in which Figure 1 is an elevation of a measuring cap embodying the invention, secured in closing relationship to the emission opening of a container, a portion of the latter being shown in cross section; Figure 2 is a sectional elevation of the measuring cap, removed from a container and with its mouth upward, ready to be used for measuring; Figure 3 is a top plan view of the measuring cap shown in Figure 2; Figure 4 is a side elevation of the measuring vessel which forms a portion of the cap; Figure 5 is a plan view of the other portion of the cap to which the measuring vessel is attached; Figure 6 is a sectional elevation of a modified form of measuring cap, arranged with its mouth upward, ready to be used for measuring; Figure 7 is a plan view of the form of cap shown in Figure 6; Figure 8 is a sectional elevation of still another form of measuring cap embodying the invention, shown mouth upward; and Figure 9 is a top plan view of the measuring cap shown in Figure 8. Like parts are referred to throughout the various views by the same reference characters.

Referring to the drawings, the invention is shown in Figure 1 as embodied in a measuring cap used with a container of sheet metal having side walls 6 and 7, and a top 8. Near one edge, the top 8 is provided with a threaded emission opening surrounded by an upstanding threaded neck 10 into which is screwed a cup-shaped sealing member 12 after the can has been filled, said sealing member 12 being permanently secured in the neck 10 and being of material which can be easily punctured as shown at 13 for the removal of the contents of the container. As shown, the container is provided with a spout 15 having a flange 16 which extends downwardly into a space between the upper edges of the collar 10 and the sealing member 12, the engagement between said parts being sufficiently loose to permit the spout 15 to be rotated from the position shown in Figure 1 to a position in which the pouring end of the spout 15 does not extend beyond the side walls of the container. The structure of the container and spout so far described is well known, and forms no part of the present invention. Moreover, it is to be understood that the new and improved measuring caps which are hereinafter described may be used with other forms of containers.

The measuring cap shown in Figures 1 to 5 comprises a cap member 18, a measuring vessel 20 and a packing member or gasket 22; said cap member and measuring vessel being made preferably of stamped sheet metal, and said gasket of cork or other yielding material. The cap member 18 serves as means for securing the measuring vessel 20 mouth-downward in closing relationship to the emission opening 13 of the container; and is shown as provided with a threaded portion 24 adapted to cooperate with the inside of the threaded portion of the sealing member 12, and is also provided at one end with an in-turned flange 26. The flange 26 is provided with a plurality of holes or slots 28, adapted to receive lugs 30 extending from the edge of the mouth of the measuring vessel 20. The packing member or gasket 22 conforms in shape and annular area to the flange 26, and is provided with holes or slots in the same relation to one another as the holes or slots 28 in the flange 26 of the cap member. In assembling the parts above described, the lugs 30, in the condition shown in Figure 4, are passed through the holes 28 in the flange 26 of the cap member and through the holes in the gasket 22, after which the ends of said lugs 30 are bent outwardly over into engagment with the gasket 22, as is best shown in Figures 2 and 3. If desired, the outer surface of the gasket 22 may be countersunk slightly so as to receive the bent-over ends of the lugs 30; but if said gasket 22 is made of sufficiently yielding material, the bent-over ends of the lugs 30 will be sunk below the outer surface of the gasket 22 by the bending operation.

From the foregoing description, it will be apparent that when the measuring cap is screwed into the threaded opening of the container, as shown in Figure 1, the gasket 22 will yieldingly engage the edge of the bottom of the sealing member 12, thereby preventing leakage from the emission opening of the container, over which the measuring vessel 20 is secured mouth downward. When the contents of the container is to be used, the measuring cap is screwed out of the emission opening and, when held with the mouth of the measuring vessel upward, as shown in Figure 2, can be filled by pouring the contents of the container out through the emission opening and the spout 15 into said measuring vessel, the capacity of which of course corresponds to the amount of material in the container needed for use under certain conditions. After the measuring cap has been thus used for measuring purposes in the dispensing of the material in the container, said cap can be replaced in the position shown in Figure 1, it being noted that in this position all portions of the measuring cap which have been wet by the contents of the container are protected from external contact and collection of dust and dirt. Moreover, it will be evident that any liquid left within the measuring vessel 20 will drain back into the container; and that while the cap is in place in the emission opening no splashing of the liquid within the container can wet the outer surface of the cap which is handled by the user while measuring and dispensing the contents of the container.

In the modified forms of the invention shown in Figures 6 to 9, instead of providing a separate measuring vessel 20, the member which screws into the emission opening of the container is itself so formed as to serve as a measuring vessel.

Referring to Figures 6 and 7, the measuring cap therein shown comprises a shell 32, made preferably of stamped sheet metal, its cylindrical portion being threaded so as to adapt it to cooperate with the inside of the threaded portion of the sealing member 12 of the container. The bottom end of the shell 32 is closed by a wall 34 which may either be integral with the shell 32 or may be, as shown, in the form of a disc which is secured within the shell by crimping over the edge of the latter, as shown in 36, or in any other suitable manner, it being understood that the sleeve 32 and the wall 34 are so joined to one another as to form a vessel capable of retaining liquid without leakage. At its other end, shell 32 is provided with an inwardly turned flange 38 terminating in a downwardly turned lip 40. Secured to the outside of the flange 38 is a gasket 42, made of cork or other suitable yielding material, which conforms in shape and annular area to the flange 38, and is held in place thereon by a thimble 44 which is slightly conical and is provided with a lip 46, said thimble being of such a size that it may be forced into and frictionally held in the opening in the shell 32 surrounded by the lip 40. As shown in Figure 6, when the thimble 44 is so arranged, its lip 46 will engage the outer surface of the gasket 42 and will hold the latter firmly in engagement with the outside of the flange 38.

The form of the invention shown in Figures 8 and 9 is similar to that shown in Figures 6 and 7 except for the means for holding the gasket 42$^a$ in engagement with the outside of the flange 38$^a$ of the shell 32$^a$. In this form of invention, the inner edge of the flange 30$^a$ is provided with lugs 50 which extend outwardly and are bent over into engagement with the outer surface of the gasket 42$^a$. The gasket 42$^a$ is thus held tightly in engagement with the outer surface of the flange 38$^a$. The gaskets 42 and 42$^a$ are preferably made of sufficiently yielding material so that the lip 46 of the thimble 44 and the lugs 50 will sink below the outer surface of said gaskets when the parts are assembled.

It will be noted that the forms of invention shown in Figures 6 to 9 offer the same advantage as the form of invention shown in Figures 1 to 5, so far as protection of the outside of the cap from contamination by the liquid of the container is concerned.

It is to be understood that the forms of the invention herein shown and described are merely illustrative and that they may be modified in many respects without departing from the spirit of the invention as defined in the claims hereto appended.

What I claim is:

1. The combination of a container having a threaded emission opening surrounded by an upstanding threaded neck into which is screwed a cup-shaped sealing member capable of being punctured, and a measuring closure for said emission opening comprising a measuring vessel provided with a threaded portion adapted to cooperate with the inside of the threaded neck of said container and also provided with a gasket secured around the mouth of said measuring vessel and adapted to cooperate with said sealing member around the punctured opening therein.

2. A measuring cap for the emission opening of a container, comprising a cap member adapted to be secured in said emission opening, said member being provided with an opening surrounded by a flange having holes therein, and a measuring vessel having lugs extending from its edge cooperating with the holes in said flange and holding said measuring vessel in closing relationship to the opening in said cap member.

3. A measuring cap for the emission opening of a container, comprising a cap member adapted to be secured in said emission opening, said cap member having an opening therethrough surrounded by a flange having holes therein, a packing ring co-operating with said flange and having holes aligning with the holes in said flange, and a measuring vessel having lugs extending through said holes in said flange and packing member and holding said packing member in engagement with said flange and said measuring vessel in closing relationship to the opening in said cap member.

In testimony whereof I have affixed my signature to this specification.

HARRISON H. BOYCE.